United States Patent

Nagata

[11] Patent Number: 6,008,842
[45] Date of Patent: Dec. 28, 1999

[54] PROTECTIVE CIRCUIT FOR THE CRT AND LENS

[75] Inventor: Koichiro Nagata, Takatsuki, Japan

[73] Assignee: Matsushita Electric Industrial Co., Ltd., Osaka, Japan

[21] Appl. No.: 08/844,238

[22] Filed: Apr. 18, 1997

[30] Foreign Application Priority Data

Apr. 19, 1996 [JP] Japan .................................... 8-098234

[51] Int. Cl.⁶ ..................................................... H04N 5/68
[52] U.S. Cl. ........................ 348/173; 348/380; 348/678
[58] Field of Search .................................. 348/179, 173, 348/380, 377, 329, 748, 174, 678, 687, 673

[56] References Cited

U.S. PATENT DOCUMENTS

| | | | |
|---|---|---|---|
| 4,722,005 | 1/1988 | Ledenbach | 348/173 |
| 5,200,829 | 4/1993 | Lagoni | 348/380 |
| 5,589,883 | 12/1996 | Ogino et al. | 348/380 |

FOREIGN PATENT DOCUMENTS 5-344371  12/1993  Japan .

Primary Examiner—Victor R. Kostak
Attorney, Agent, or Firm—Ratner & Prestia

[57] ABSTRACT

A protective circuit and a signal processor for a three-CRT projection TV for preventing CRT burnout, deterioration of luminous characteristics, and damage to lenses by heat. Each CRT beam current detection circuit detects the beam current of each CRT. A state of the video image is predicted based on the detected beam current values and their duration. A microcomputer determines a control voltage for controlling the contrast based on the state of the video image, detected values, and their duration. The contrast is thus controlled by a control signal output to a video control circuit which controls the beam current.

21 Claims, 9 Drawing Sheets

PROTECTIVE CIRCUIT FOR THE CRT AND LENS

FIELD OF THE INVENTION

The present invention relates to the field of electric circuits used for electronic devices employing CRTs and, more particularly, to electric circuits for preventing damage to CRTs and lenses used in 3-CRT projection TVs.

BACKGROUND OF THE INVENTION

When excessive beam current flows through projection TVs consisting of three CRTs for projecting red, blue, and green video images and a lens system, damage such as CRT burnout due to beam current, deterioration of luminous characteristics, and deterioration of lenses and lens coating due to heat generation may occur. (Hereafter referred to as deterioration of the CRT and lens).

To prevent this deterioration, conventional 3-CRT projection TVs detect the beam current of each CRT and measure the duration when the detected value exceeds a certain value. The duration is measured based on a circuit time constant using a resistance and capacitor. Then, in response to measurement results, a control circuit is employed to reduce the level of beam current. However, this type of control circuit suffers from too large a control error.

Conventional 3-CRT projection TVs which can project still pictures employ, for example, a circuit configured with a field discriminating circuit, an A/D converter, a D/A converter, and a field memory, which is same as that used for 1-CRT direct view TVs, as is disclosed in Japanese Laid-open Patent No. H5-344371 for preventing deterioration of the CRT and lens. Intervals with a smaller difference in fields are counted and a control voltage is output in response to the results.

This circuit also detects the beam current of each CRT and measures the duration when the detected value exceeds a certain value. The duration is measured based on a circuit time constant using a resistance and capacitor. The level of beam current is then reduced in response to the measurement results.

This method reduces the video contrast at a fixed rate due to the use of the circuit time constant. Therefore, in some cases, the time taken to detect the beam current for preventing deterioration of the CRT and lens before the beam current is reduced to a safe level for preventing CRT phosphor burnout may not be appropriate, resulting in the deterioration of the CRT and lens in some video patterns.

In addition, as 2-picture wide screen TVs and teletext broadcasting are becoming more popular, usage where the beam current is concentrated on either the left or right side of CRTs is increasing. A conventional circuit configuration is incapable of protecting CRTs under these usage conditions.

Furthermore, the circuit disclosed in the Japanese Laid-open Patent No. H5-344371 is expensive.

SUMMARY OF THE INVENTION

To solve disadvantages described above, the present invention provides a method for protecting the CRT and lens for 3-CRT projection TVs, which comprise three CRTs for projecting red, blue, and green video images, and a lens system. Specifically, the present invention offers a protective circuit for the CRT and lens which comprises a means for detecting the level of beam current flowing through each CRT, a means for measuring the duration of the detected value, a means for outputting a control signal for controlling video contrast by comparing the duration of the detected value with a specified time, and a means for controlling the beam current by adjusting the contrast using this control signal. The present invention can be manufactured at relatively low cost, and is capable of preventing CRT burnout, deterioration of luminous characteristics, and deterioration of lenses by heat peculiar to 3-CRT projection TVs.

DESCRIPTION OF THE PREFERRED EMBODIMENTS

1ST EXEMPLARY EMBODIMENT

A first exemplary embodiment of the present invention is explained with reference to FIG. 1.

Figure 1:
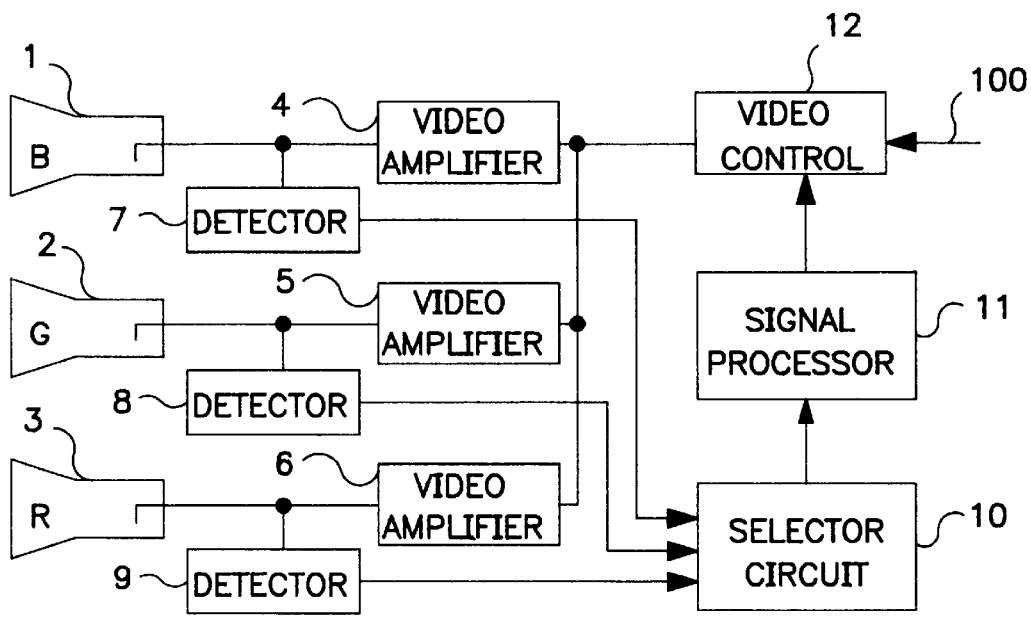
FIG. 1 is a block diagram of a protective circuit for the CRT and lens in a first exemplary embodiment of the present invention.

FIG. 1 is a block diagram of a protective circuit for the CRT and lens of the present invention for 3-CRT projection TVs.

In FIG. 1, CRTs 1, 2, and 3 output blue (B), green (G), and red (R) video images respectively, and a lens system (not illustrated) is disposed in front of these CRTs. Video amplifiers (AMP) 4, 5, and 6 amplify respective blue, green and red video signals, and drive respective CRTs 1, 2, and 3.

Beam current detection circuits 7, 8, and 9, each of which include a current detection unit and a smoothing circuit, detect the beam current level of each CRT 1, 2, and 3.

A selecting circuit 10 selects the largest signal from those output from the beam current detection circuits 7, 8, and 9, and outputs the largest signal as a detected value. This detected value is input to a signal processor 11 which comprises a microprocessor, for example, and the duration of the detected value is measured to compare with a specified standard value. The signal processor 11 outputs a control voltage, based on the comparison result and the detected value, to control a video control circuit 12. Detailed operations of the signal processor are described in and after a seventh exemplary embodiment.

The video control circuit 12, whose input is a video signal 100 and the control voltage from the signal processor 11, controls the beam current by controlling a video signal to be output to the video amplifiers 4, 5, and 6.

The protective circuit for the CRT and lens of the first exemplary embodiment thus controls the beam current to protect the CRT and lens by continuously monitoring the beam current for predicting the state of a video image from a monitored value, that is a detected value, and its duration, and calculating control conditions.

2ND EXEMPLARY EMBODIMENT

A second exemplary embodiment of the present invention is explained with reference to FIG. 2.

Figure 2:
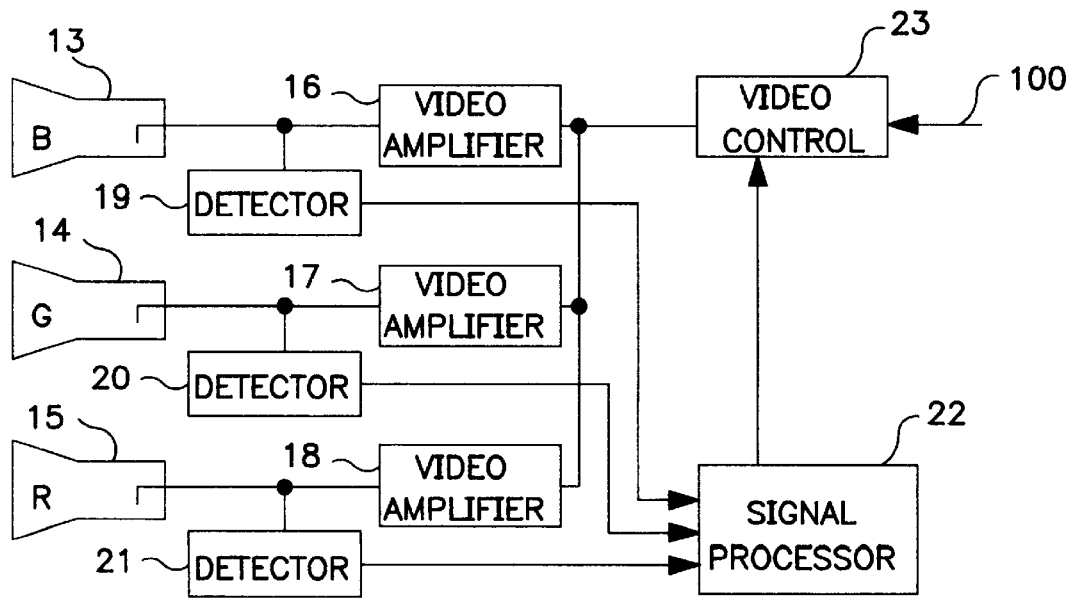
FIG. 2 is a block diagram of a protective circuit for the CRT and lens in a second exemplary embodiment of the present invention.

FIG. 2 is a block diagram of a protective circuit for the CRT and lens of the present invention for 3-CRT projection TVs.

In FIG. 2, CRTs 13, 14, and 15 output blue (B), green (G), and red (R) video images respectively. A lens system (not illustrated) is disposed in front of these CRTs. Video amplifiers (AMP) 16, 17, and 18 amplify respective blue, green, and red video signals, and drive respective CRTs 13, 14, and 15. Beam current detection circuits 19, 20, and 21, each of which include a current detection unit and a smoothing circuit, detect the beam current level of each CRT 13, 14, and 15. A signal processor 22, whose input is detected values of the beam current detection circuits 19, 20, and 21, outputs a control voltage. A video control circuit 23, whose input is the control voltage from the signal processor 22, controls the beam current by controlling video signals to be output to video amplifiers 16, 17, and 18.

The signal processor 22 predicts a state of the video image by calculating the detected values and their duration.

Specifically, the signal processor 22 compares the duration of the detected values with a specified standard value, and outputs a control voltage, calculated from the comparison results, detected values, and the state of the video image, to the video control circuit 23.

Single or multiple standard values for comparing with the duration are preset corresponding to detected values.

In the operation of the signal processor 22, a preset alternative value may be used instead of the detected value. In other words, when the detected value exceeds the standard value, this standard value may be used as an alternative value instead of the detected value. As with the settings for duration, single or multiple standard values are set as alternative values for detected values.

It is known that still pictures damage CRTs and lenses even at relatively low beam current levels. If all three detected values of R, G, and B maintain the same values for a specified duration, it is determined to be a still picture. If three detected values of three inputs of a picture change more than once in a specified duration, it is determined to be a moving picture. When a picture is determined to be still, the video control circuit is controlled to reduce a beam current level, although the detected value is relatively low.

An advantage of this exemplary embodiment compared to the first exemplary embodiment is that the state of a video image can be more accurately predicted by detecting the beam current of three CRTs for R, G, and B, thus the CRT and lens are protected with further accuracy.

THIRD EXEMPLARY EMBODIMENT

A third exemplary embodiment of the present invention is explained with reference to FIG. 3.

A protective circuit of the present invention is suitable for cases when two input video images are projected as two pictures such as on a picture-in-picture screen.

Figure 3:
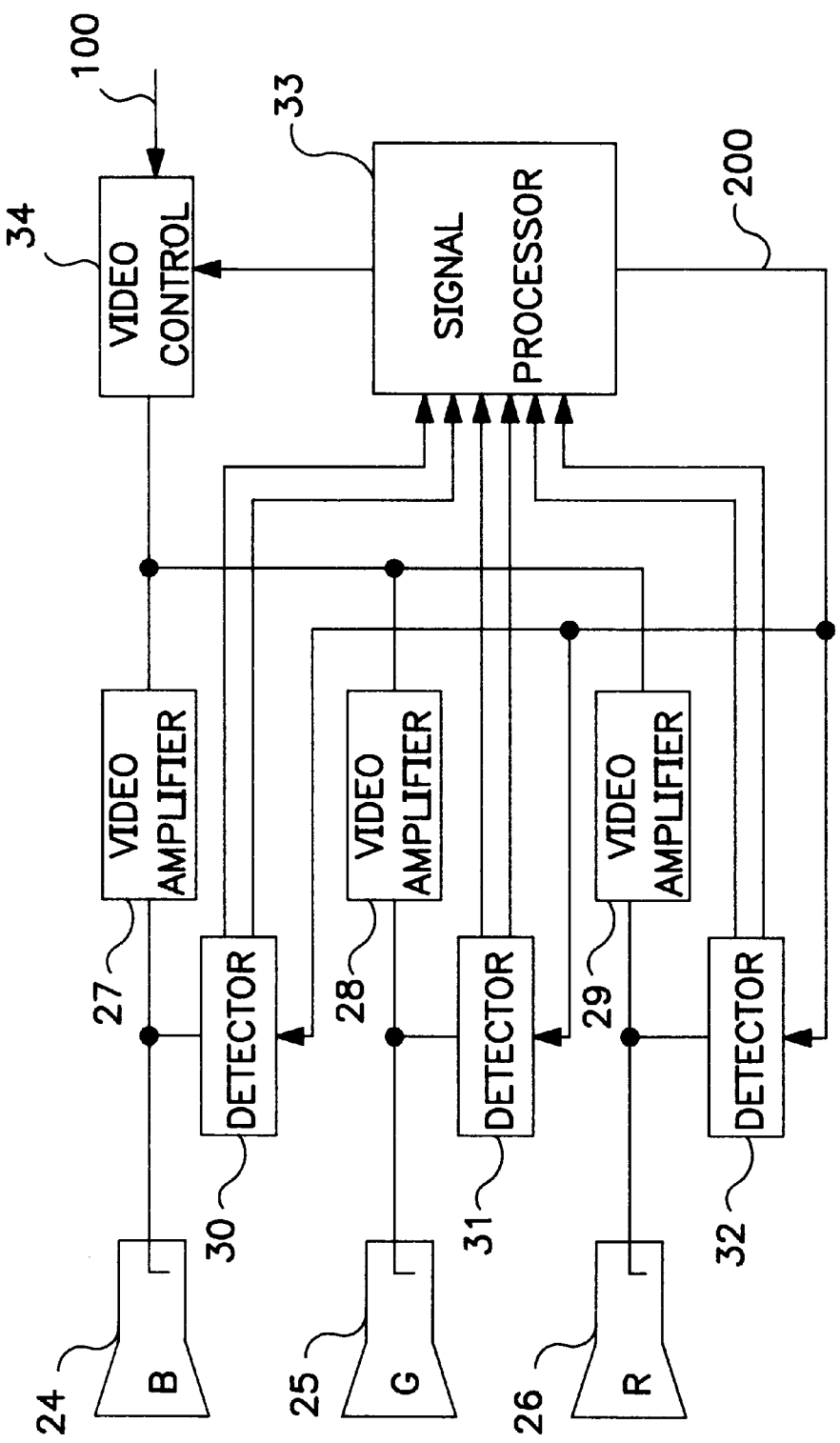
FIG. 3 is a block diagram of a protective circuit for the CRT and lens in a third exemplary embodiment of the present invention.

In FIG. 3, CRTs 24, 25, and 26 output blue (B), green (G), and red (R) video images, respectively. A lens system (not illustrated) is disposed in front of these CRTs. Video amplifiers (AMP) 27, 28, and 29 amplify respective blue, green and red video signals, and drive each CRT. Beam current detection circuits 30, 31, and 32, each of which include a current detection unit, switching circuit, and smoothing circuit, detect the beam current level of each CRT for blue, green and red.

A signal processor 33, whose input is the detected value output from the beam current detection circuits 30, 31, and 32, outputs a control voltage based on the detected values of the beam current detection circuits and their duration. A video control circuit 34, whose input is the control voltage from the signal processor 33, controls the beam current by controlling input video signals to be output to the video amplifiers 27, 28, and 29.

When video images are projected on two pictures, the signal processor 33 sends the information which divides two pictures, i.e. a multi-picture mode switchover signal 200 to each of the beam current detection circuits 30, 31, and 32.

In accordance with the multi-picture mode switchover signal 200, the switching circuit switches the output of the current detection unit or current detection circuit, so that each of the beam current detection circuits can detect the beam current corresponding to each of the two pictures. In other words, the detected values for R, G, and B of two pictures, six detected values in total, and their duration are input to the signal processor 33.

The signal processor 33 predicts the state of video images by calculating the detected values and the duration of the two pictures.

For example, when all three detected values of R, G, and B of both pictures maintain the same values, it is determined that both are still pictures. When all three detected values of R, G, and B of either picture maintain the same values, it is determined that only that one is a still picture. It is known that still pictures damage CRTs and lenses even at relatively low beam current levels. The signal processor 33 compares the duration of the detected values with a specified standard, and outputs a required control voltage, that it has calculated based on the comparison results, detected values, and state of the video image, to the video control circuit 34.

Single or multiple standard values for the duration are preset corresponding to detected values.

In the operation of the signal processor, a preset alternative value may be used instead of the detected value. In other words, when the detected value exceeds the standard value, this standard value may be used as an alternative value instead of the detected value. As with the settings for duration, single or multiple alternative standard values are set as alternative values for detected values. When multiple standard values are set, the detected value is compared with the larger current standard value. After comparison, if the detected value and its duration exceed the standard values, (i.e. the standard values used for evaluating the possibility of deterioration of the CRT and lens), the control voltage to be input to the video control circuit operates so that the video control circuit reduces video contrast and thereby reducing the beam current.

4TH EXEMPLARY EMBODIMENT

A fourth exemplary embodiment of the present invention is explained with reference to FIG. 4.

A protective circuit of the present invention is suitable for cases when two input video images are projected as two pictures on a screen.

Figure 4:
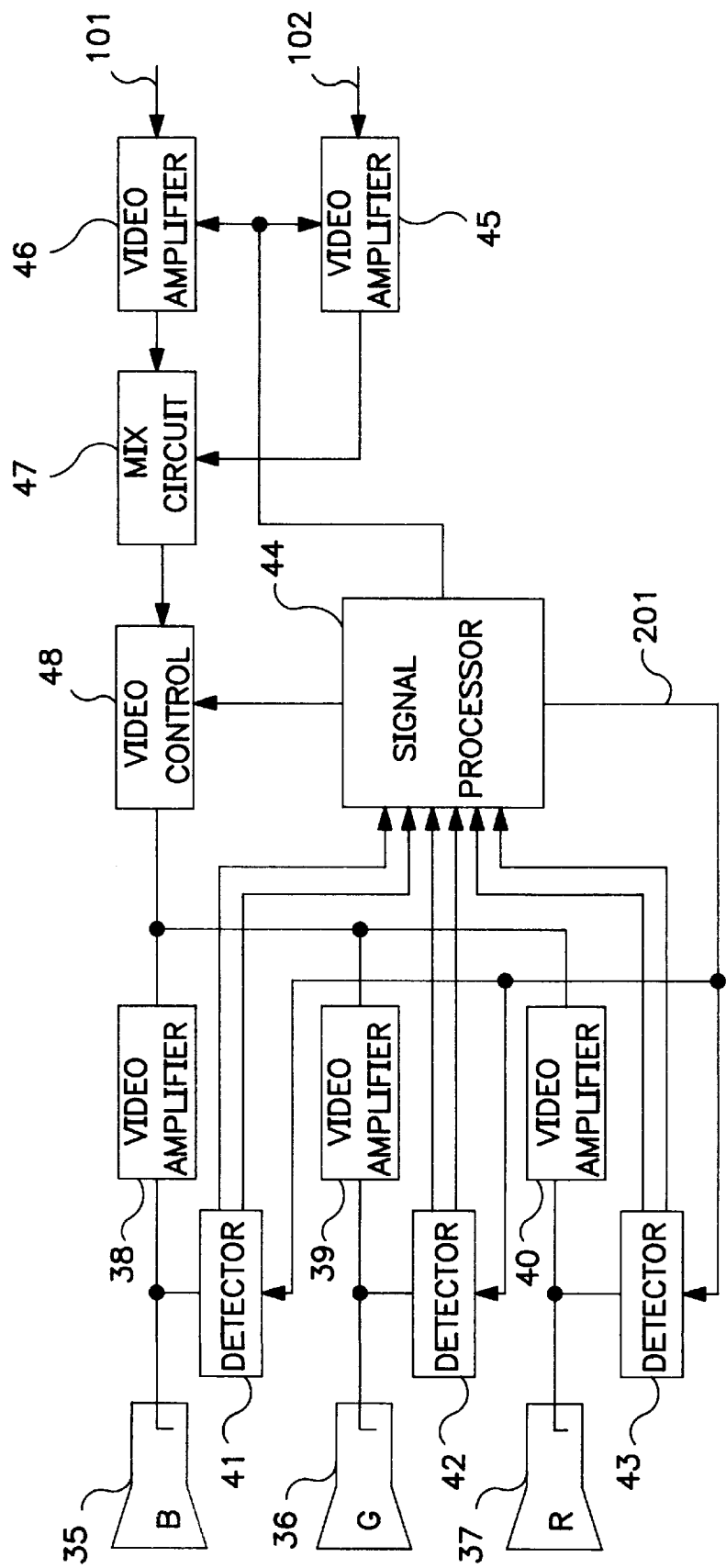
FIG. 4 is a block diagram of a protective circuit for the CRT and lens in a fourth exemplary embodiment of the present invention.

In FIG. 4, CRTs 35, 36, and 37 output blue (B), green (G), and red (R) video images respectively. A lens system (not illustrated) is disposed in front of these CRTs. Video amplifiers (AMP) 39, 39, and 40 amplify respective blue, green and red video signals, and drive each CRT. Beam current detection circuits 41, 42, and 43, each of which include a current detection unit, switching circuit, and smoothing circuit, detect the beam current level of each CRT 35, 36 and 37. A video amplifier (AMP) 45 amplifies an input video signal 102 for a sub-screen, and a video amplifier (AMP) 46 amplifies an input video signal 101 for a main screen. A mix circuit (MIX) 47 mixes these video signals for projecting two video images on the main and sub screens. A signal processor 44, whose input is detected values output from the beam current detection circuits 41, 42, and 43, outputs a control voltage based on the detected values from the beam current detection circuits and their duration. A video control circuit 48, whose input is the control voltage from the signal processor 44, controls the beam current by controlling input video signals to be output to the video amplifiers 38, 39, and 40.

When video images are projected on two pictures, a signal processor 44 sends the information on a two-picture state (positional information which divides two pictures), i.e. a multi-picture mode switchover signal 201, to each of the beam current detection circuits 41, 42, and 43.

In accordance with the multi-picture mode switchover signal 201, the beam current detection circuits detect the beam current of each picture and output the detected values.

The signal processor 44 recognizes the present state of video images based on the six detected values and their duration, which are input from the beam current detection circuits 41, 42, and 43, and controls the video control circuit 48, the video amplifier 46 for controlling the first video signal 101 for the main screen, and the video amplifier 45 for controlling the second video signal 102 for the sub-screen.

How the signal processor 44 operates in order to output the control voltage for controlling contrast is the same as that described in the third exemplary embodiment. The difference is that, in the fourth exemplary embodiment, the video amplifier 4 6 controls the main screen, the video amplifier 45 controls the sub screen, and the video control circuit 48 controls the full screen in the two-picture projection.

FIFTH EXEMPLARY EMBODIMENT

A fifth exemplary embodiment of the present invention is explained with reference to FIG. 5.

Figure 5:
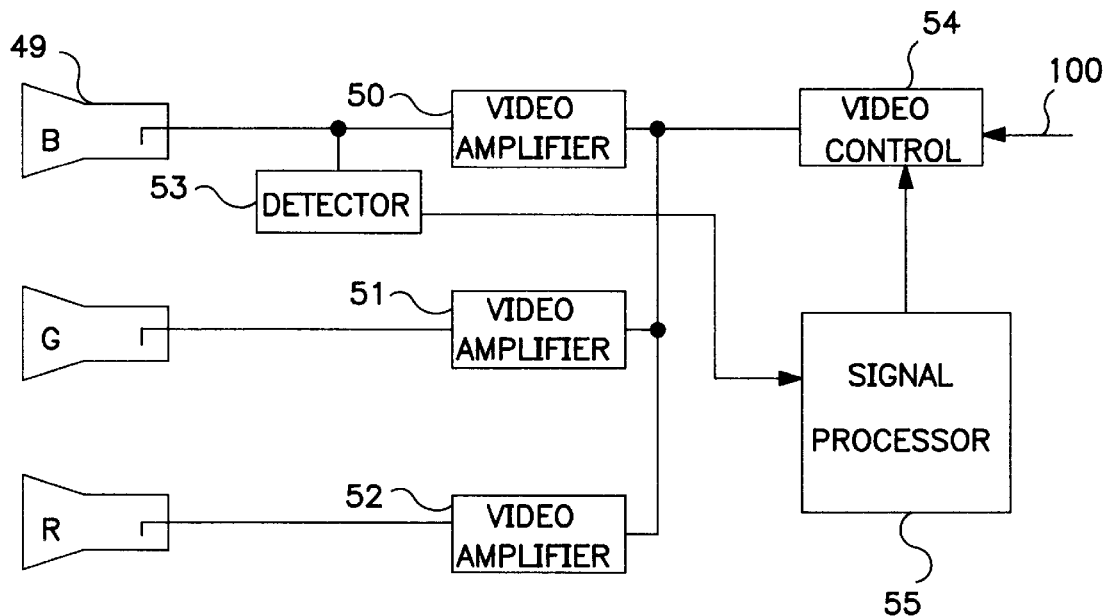
FIG. 5 is a block diagram of a protective circuit for the CRT and lens in a fifth exemplary embodiment of the present invention.

FIG. 5 is a block diagram of a protective circuit for the CRT and lens of the present invention for 3-CRT projection TVs.

In FIG. 5, a CRT 49 projects blue video images, and a lens system (not illustrated) is disposed in front of the CRTs. Video amplifiers (AMP) 50, 51, and 52 amplify blue, green and red video signals, respectively, and drive each CRT. A beam current detection circuit 53, which includes a current detection unit and a smoothing circuit, detects the beam current level of the CRT for blue color, and outputs the level as a direct current.

A signal processor 55, whose input is the detected value output from the beam current detection circuit 53, outputs a control voltage based on the detected value and its duration. A video control circuit 54, whose input is the control voltage from the signal processor 55, controls the beam current by controlling video signals to be output to the video amplifiers 50, 51, and 52.

When the duration of the detected value exceeds a standard value (i.e., the standard value for evaluating the risk of deterioration of the CRT and lens), the control voltage to be input to the video control circuit 54 operates so that the video control circuit 54 reduces video contrast, thereby reducing the beam current.

The circuit configuration and operation of the fifth exemplary embodiment are the same as those described in the second exemplary embodiment, except that the fifth exemplary embodiment detects only the beam current of blue video signals.

In general, for 3-CRT projection TVs, it is known that the greatest beam current flows to the CRT for blue color among red, green, and blue CRTs. Practically speaking, CRTs for blue color have the highest likelihood of CRT phosphor burnout, deterioration of luminous characteristics and damage caused to the lens by heat. Accordingly, the lens for the three CRTs for red, blue, and green can be easily protected using a simple circuit configuration by only detecting the beam current of the CRT for blue color and controlling the a video contrast when it is determined that burnout may occur on a blue CRT phosphor screen.

6TH EXEMPLARY EMBODIMENT

Figure 6:
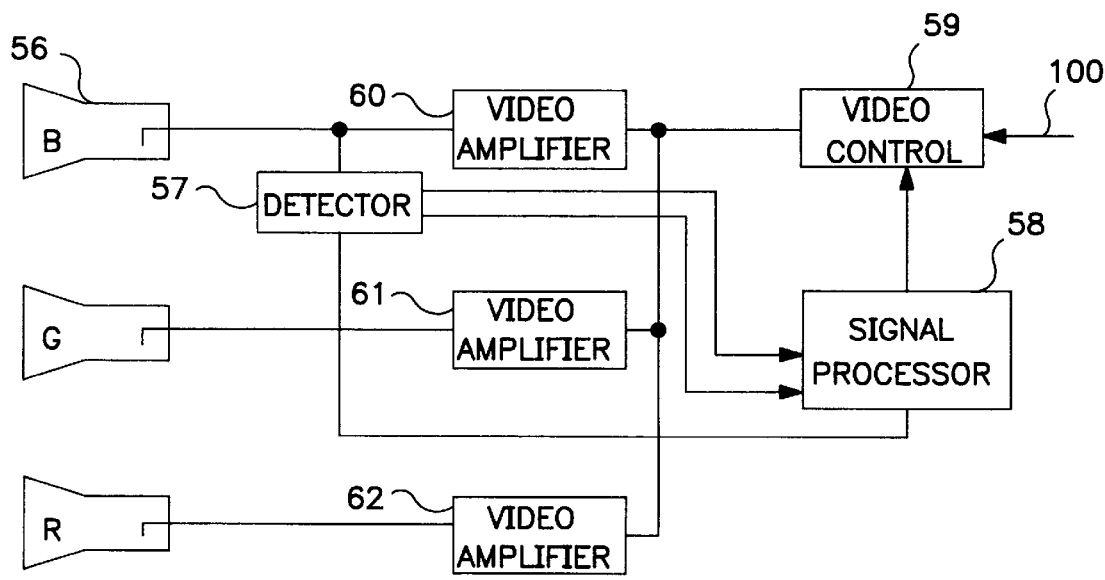
FIG. 6 is a block diagram of a protective circuit for the CRT and lens in a sixth exemplary embodiment of the present invention.

FIG. 6 is a block diagram of protective circuit for the CRT and lens described in the sixth exemplary embodiment of the present invention for 3-CRT projection TVs. A protective circuit of the present invention is further suitable for cases when two video images are projected as two pictures on a screen.

In FIG. 6, a CRT 56 projects blue video images, and a lens system (not illustrated) is disposed in front of the CRTs. Video amplifiers (AMP) 60, 61, and 62 amplify blue, green and red video signals, respectively, and drive each CRT. A beam current detection circuit 57, which includes a current detection unit, switching circuit and a smoothing circuit, detects the beam current level of the CRT for blue color. A signal processor 58, whose input is the detected value output from the beam current detection circuit 57, outputs a control voltage based on the detected value of the detection circuit and its duration.

A video control circuit 59, whose input is the control voltage from the signal processor 58, controls the beam current by controlling input video signals to be output to the video amplifiers 60, 61, and 62.

The circuit configuration, operation, function and characteristics of the sixth exemplary embodiment are the same as those described in the third exemplary embodiment, except that the sixth exemplary embodiment detects only the beam current of blue video signals.

In general, for 3-CRT projection TVs, it is known that the greatest beam current flows to the CRT for blue color among red, green, and blue CRTs. Practically speaking, CRTs for blue color have the highest likelihood of CRT phosphor burnout, deterioration of luminous characteristics and damage caused to the lens by heat. Accordingly, the lens for the three CRTs for red, blue, and green can be easily protected using a simple circuit configuration by only detecting the beam current of the CRT for blue color and controlling the video contrast when it is judged that burnout may occur on a blue CRT phosphor screen.

SEVENTH EXEMPLARY EMBODIMENT

Figure 7:
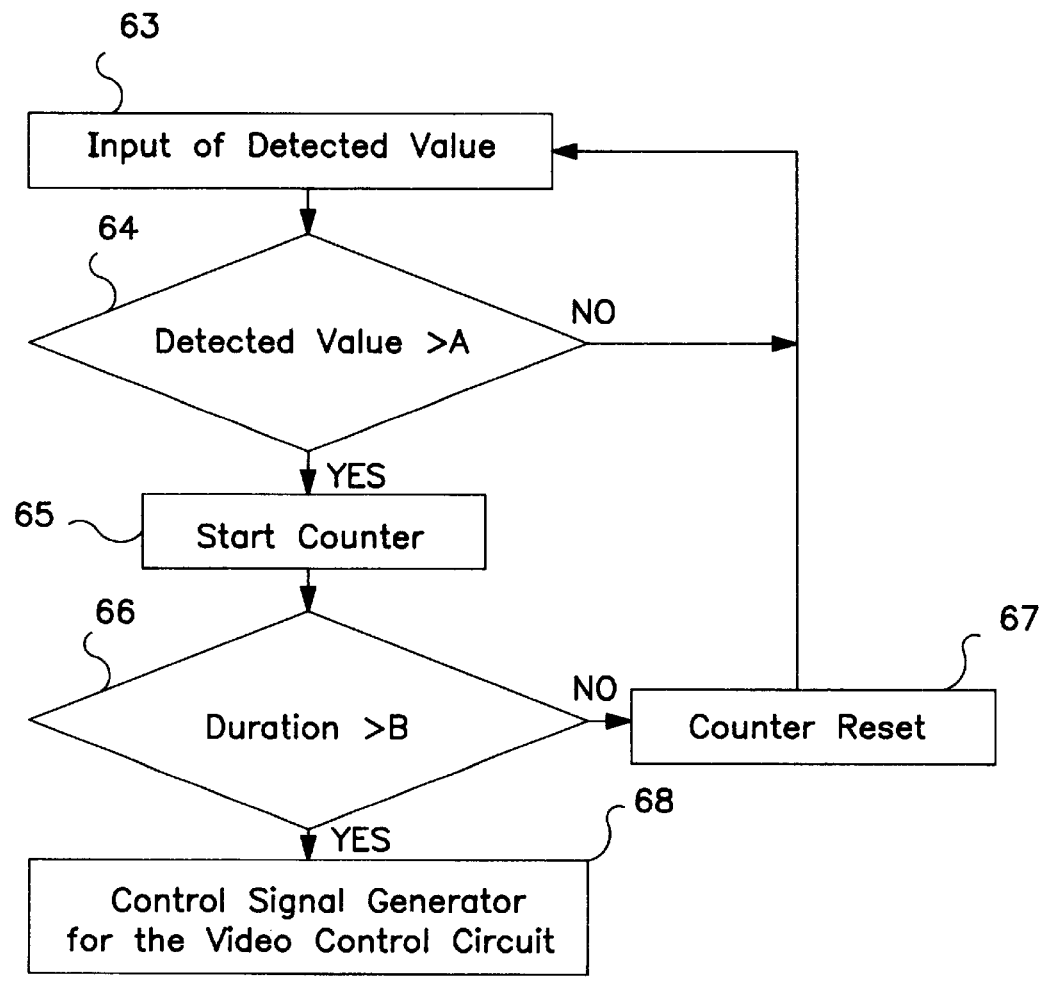
FIG. 7 is a flow chart illustrating an example of how a signal processor controls a video control circuit in a seventh exemplary embodiment of the present invention.

FIG. 7 is a flow chart illustrating an example of initial operation of the signal processor employed in the protective circuit for the CRT and lens described in the first to sixth exemplary embodiments.

The signal processor includes a comparator 64 for comparing a detected value 63 detected by the beam current detection circuit with a standard value, a counter 65 for measuring duration of the detected value, and a comparator 66 for comparing the duration measured by the counter with a standard value; and is controlled with a microprocessor.

In FIG. 7, the detected value 63 is the value detected by each beam current detection circuit in the first to sixth exemplary embodiments, and is provided as the information for recognizing the present state of the video image. The detected value 63 is continuously input to the comparator 64 for comparison with the first standard value A.

In general, deterioration of the CRT and lens is not caused by a single factor. For example, it depends on the beam current level and its duration. If a large beam current flows, damage occurs in a short duration. In contrast, if small beam current flows, damage occurs after a long duration of this-condition. Therefore, the first standard value used for evaluating the beam current comprises more than one value. The second standard value used for evaluating duration also comprises more than one value. The first standard value A, for evaluating the beam current, and the second standard value B, for evaluating its duration, are in a functional relationship.

Thus, both standard values A and B comprise multiple values, and standard value B is preset corresponding to standard value A. When standard value A comprises more than one value, the signal processor uses the smallest of the multiple values for standard value A at the start of operations. When the detected value 63 is found to be larger than the first standard value A, set in the comparator 64, the detected value is input to a standard value judging unit (not illustrated).

The standard value judging unit compares the detected value with a standard value which is one level higher than the first standard value A set in the comparator 64. If the detected value is larger than this higher standard value, the first standard value A of comparator 64 is set to this higher standard value, and the comparison process using comparator 64 repeats. This process is repeated until the detected value input to the standard value judging unit is smaller than the new standard value. When the detected value is smaller than the standard value which is one level higher than the first standard value A set in the comparator 64, the standard value A of comparator 64 is set to this higher standard level and counter 65 starts counting.

The counter 65 measures the duration of the detected value. The comparator 66 compares the measured time counted by the counter 65 with a second standard value B set in accordance with the value of first standard value A. A counter reset 67 resets the time measured by counter 65 to zero when the time measured by the counter 65 is shorter (duration does not reach the standard time) than the second standard value B (standard time). When the comparator 66 determines that the time measured by counter 65 is longer than the second standard value B, comparator 66 outputs a signal to a control signal generator 68 for the video control circuit.

Based on this information, the signal processor outputs the control voltage to reduce the gain of 1) each video control circuit, 2) the video amplifier for the main screen, or 3) the video amplifier for the sub-screen as described in the first to sixth exemplary embodiments.

8TH EXEMPLARY EMBODIMENT

Figure 8:
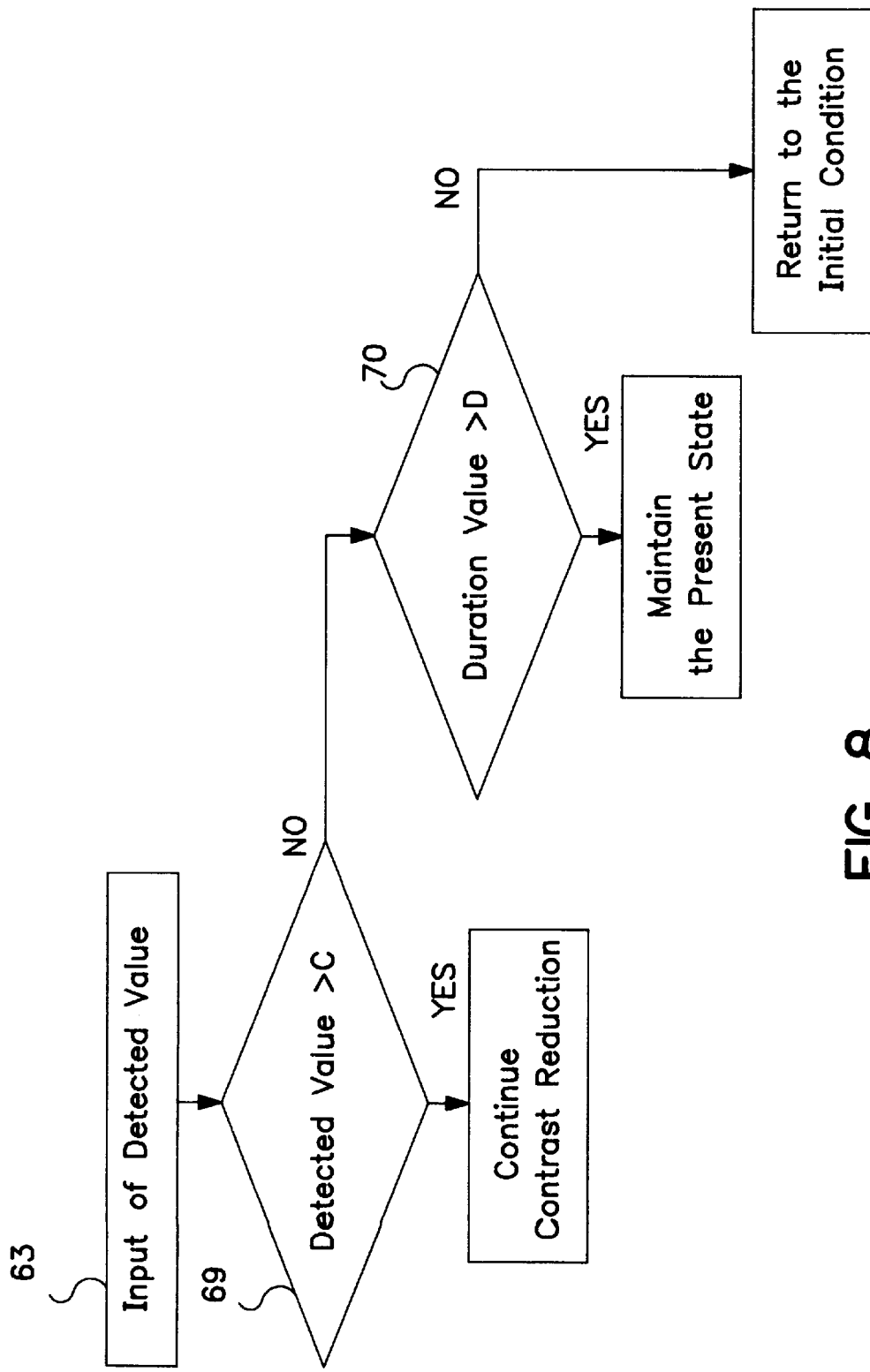
FIG. 8 is a flow chart illustrating an example of how a signal processor controls a video control circuit in an eighth exemplary embodiment of the present invention.

FIG. 8 is a flow chart illustrating an example of how the signal processor, employed in a protective circuit for the CRT and lens as described in the first to sixth exemplary embodiments, controls the video control circuit.

In FIG. 8, the detected value 63 is the value detected by the beam detection circuit, which shows the present state of the video image. The comparator 69 compares the detected value 63 with a first standard value C. When the detected value 63 is larger than the first standard value C, contrast is reduced, otherwise the next process is implemented.

A comparator 70 compares the detected value 63 with a second standard value D. When the detected value 63 is larger than the second standard value D, the control for reducing the contrast is stopped, and the contrast level is maintained. When the detected value 63 is smaller than the second standard value D, the operation of the signal processor is initialized.

In the example shown in FIG. 7, the operation for reducing the beam current can be stopped and initialized by controlling the video control circuit. Thus, the present invention assures smooth operation for protecting the CRT and lens.

9TH EXEMPLARY EMBODIMENT

Figure 9:
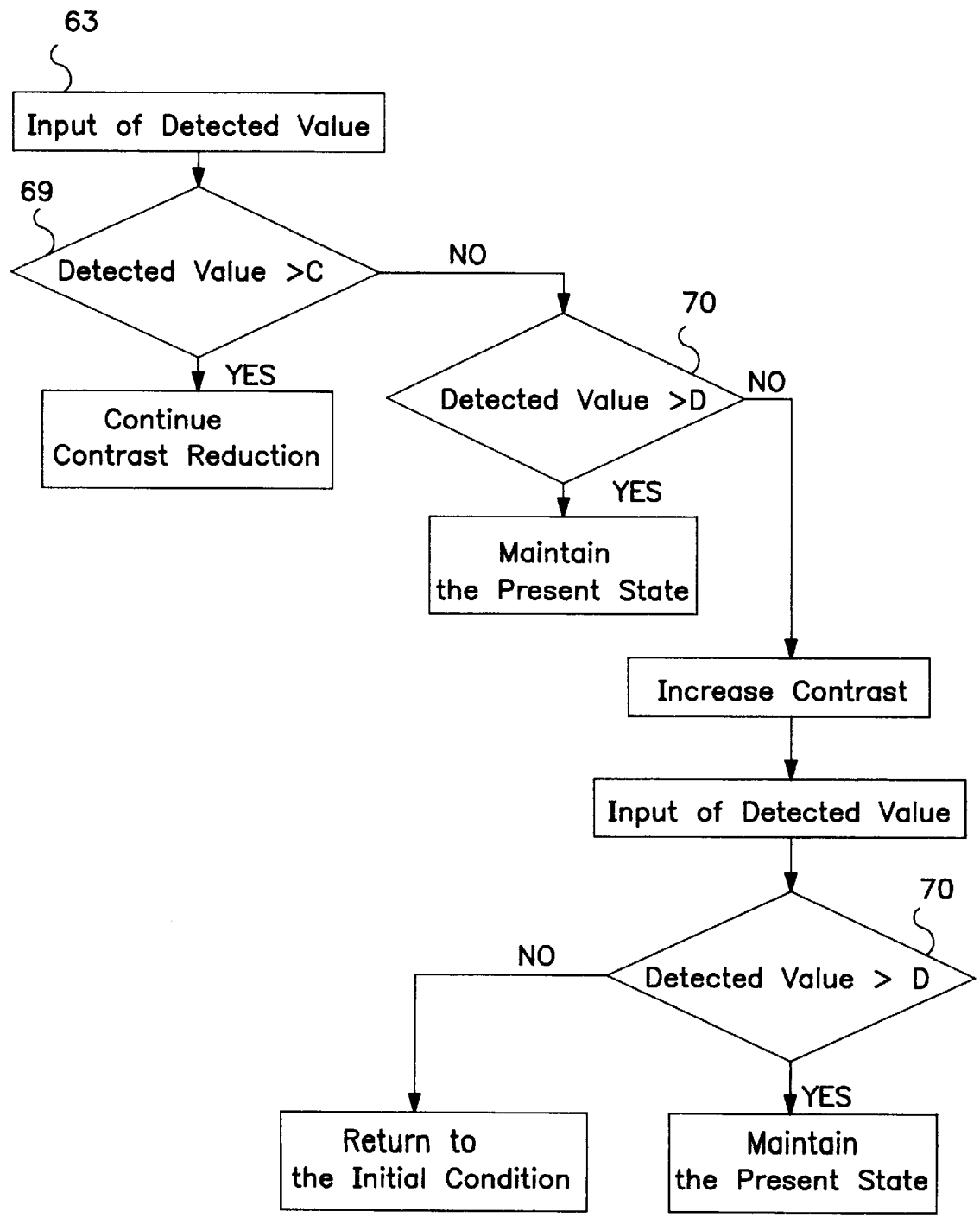
FIG. 9 is a flow chart illustrating an example of how a signal processor controls a video control circuit in an ninth exemplary embodiment of the present invention.

FIG. 9 is a flow chart illustrating an example of how the signal processor, employed in a protective circuit for CRT and lens as described in the first to sixth exemplary embodiments, controls the video control circuit.

In FIG. 9, the detected value 63 is the value detected by the beam detection circuit, which shows the present state of the video image. The comparator 69 compares the detected value 63 with the first standard value C. When the detected value 63 is larger than the first standard value C, the contrast is reduced, otherwise the next process is implemented.

The comparator 70 compares the detected value 63 with the second standard value D. When the detected value 63 is larger than the second standard value D, the control for reducing the contrast is stopped, and the contrast level is maintained. When the detected value 63 is smaller than the second standard value D, the contrast is increased by a specified value. After increasing the contrast by the specified value, the resulting contrast level is maintained for a specified time. After this specified time has elapsed, the beam current is detected again, and the comparator 70 compares the detected value with the second standard value D. When the detected value is larger than the second standard value D, the control for reducing the contrast is stopped and the contrast level is maintained. When the detected value is smaller than the second standard value D, the operation of the signal processor is initialized.

This improves the difficulty in stabilizing a detected value, after the beam current is reduced, within a stable range between the standard value C and the standard value D. The difficulty arises because it takes time to feed the detected value back to the signal processor after the contrast is actually reduced when the signal processor controls the video control circuit (including the video amplifier for amplifying an input video signal for a main screen and the video amplifier for amplifying an input video signal for a sub-screen).

10TH EXEMPLARY EMBODIMENT

Figure 10:
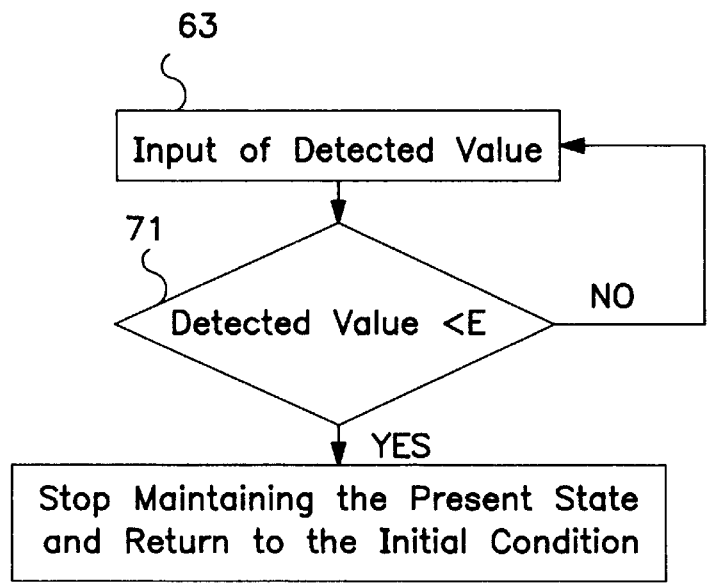
FIG. 10 is a flow chart illustrating an example of how a signal processor controls a video control circuit in a tenth exemplary embodiment of the present invention.

FIG. 10 is a flow chart illustrating an example of how the signal processor, employed in a protective circuit for the CRT and lens as described in the first to sixth exemplary embodiments, controls the video control circuit.

How the signal processor maintains the present control state of the video control circuit in the eighth and ninth exemplary embodiments is explained below.

In FIG. 10, the detected value 63 is the value detected by the beam detection circuit, which shows the present state of the video image. A comparator 71 compares the detected value 63 with a first standard value E. When the detected value 63 is larger than the first standard value E, the present control of the video control circuit is maintained, otherwise the operation of the signal processor is initialized.

11TH EXEMPLARY EMBODIMENT

Figure 11:
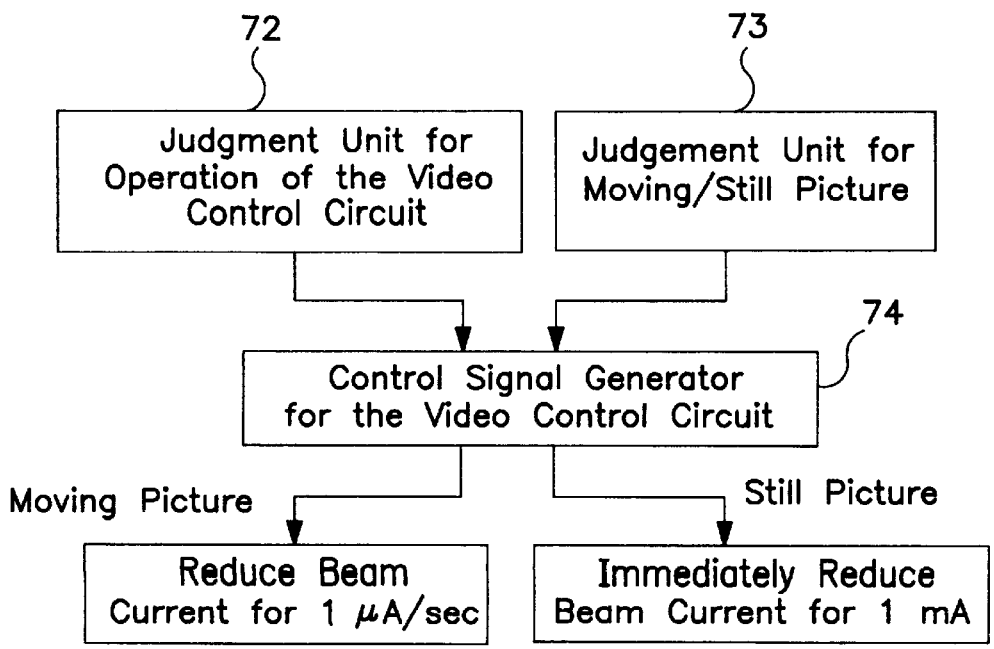
FIG. 11 is a flow chart illustrating an example of how a signal processor controls a video control circuit in an eleventh exemplary embodiment of the present invention.

FIG. 11 is a flow chart illustrating an example of how the signal processor, employed in the protective circuit for the CRT and lens described in the first to sixth exemplary embodiments, controls the video control circuit.

FIG. 11 shows an example of how the signal processor operates when employed in a protective circuit for the CRT and lens as described in the second to fourth exemplary embodiments.

When moving pictures are displayed and the signal processor evaluates the risk of CRT phosphor burnout, the speed at which beam current reduction takes place is reduced so that viewers will not become aware of the reduction of video contrast. When still pictures are displayed and the signal processor evaluates the risk of CRT phosphor burnout, the speed at which the beam current is reduced is accelerated. In many cases, when still pictures continue in video games and laser disks, viewers are not watching the TV, in other words, viewers have simply forgotten to turn the TV off. Therefore, the beam current is rapidly reduced to promptly avoid conditions hazardous to the CRT phosphor screen.

In FIG. 11, the judgment unit 72 for operation of the video control circuit is part of the implementing processing operation of the signal processor described in the seventh to ninth exemplary embodiments, and decides whether to reduce the video contrast.

A judgment unit for moving/still picture 73 decides whether a video image is a still picture or a moving picture based on the detected value from each beam current detection circuit described in the second to fourth exemplary embodiments. For example, if three detected values of R, G, and B maintain the same values for a specified time, the image is determined to be a still picture. If three detected values change during a specified time, the image is determined to be a moving picture.

A control signal generator 74 for the video control circuit reduces the beam current by 1 $\mu$A per second; for example, when the evaluation result of the judgment unit 72 for operation of the video control circuit and the judgment unit for moving/still picture 73 is a moving picture. The beam current is immediately reduced by 1 $\mu$A; for example, when a still picture is detected.

12TH EXEMPLARY EMBODIMENT

Figure 12:
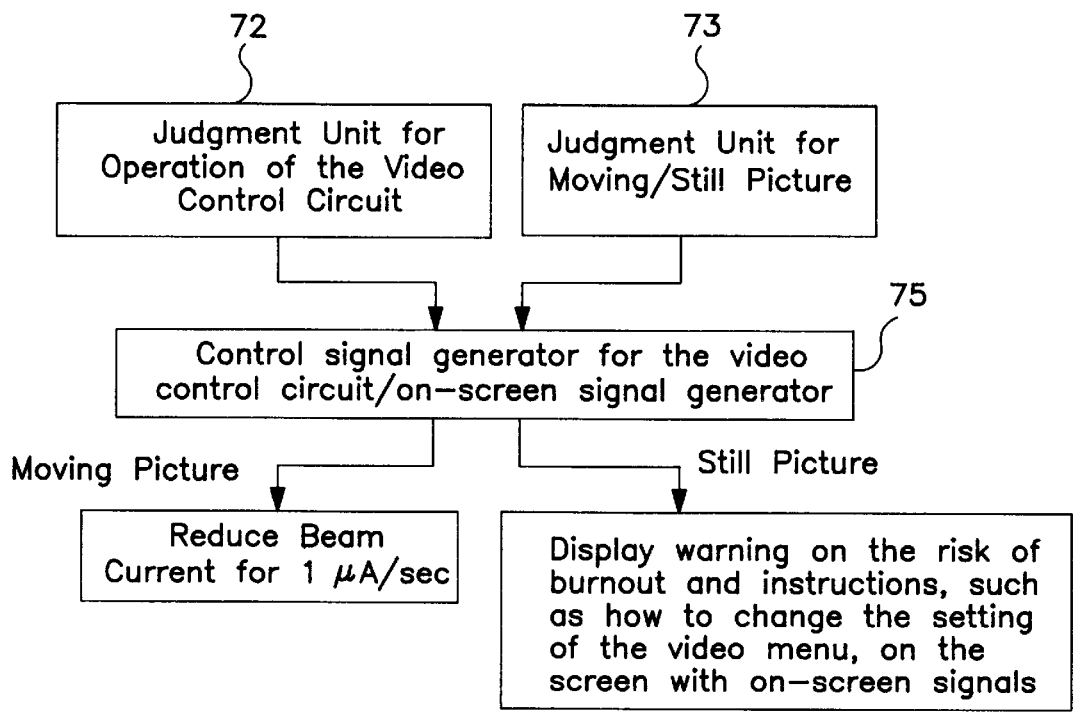
FIG. 12 is a flow chart illustrating an example of how a signal processor controls a video control circuit in a twelfth exemplary embodiment of the present invention.

FIG. 12 is a flow chart illustrating an example of how the signal processor, employed in a protective circuit for CRT and lens as described in the first to sixth exemplary embodiments, controls the video control circuit.

In FIG. 12, a judgment unit 72 for operation of the video control circuit is part of the implementing processing operation of the signal processor described in the seventh to ninth exemplary embodiments, and decides whether to reduce the video contrast.

A judgment unit for moving/still picture 73 determines whether a video image is a still or moving picture based on the detected value from each beam current detection circuit described in the second to fourth exemplary embodiments.

The video control circuit and an on-screen signal generator 75 reduce the beam current by 1 $\mu$A per second when the evaluation result of the judgment unit 72 for operation of the video control circuit and the judgment unit for moving/still picture 73 is a moving picture. Otherwise, a message warning of burnout of the CRT screen and instructions for changing the setting of the video menu are displayed on the screen using on-screen signals.

13TH EXEMPLARY EMBODIMENT

Figure 13:
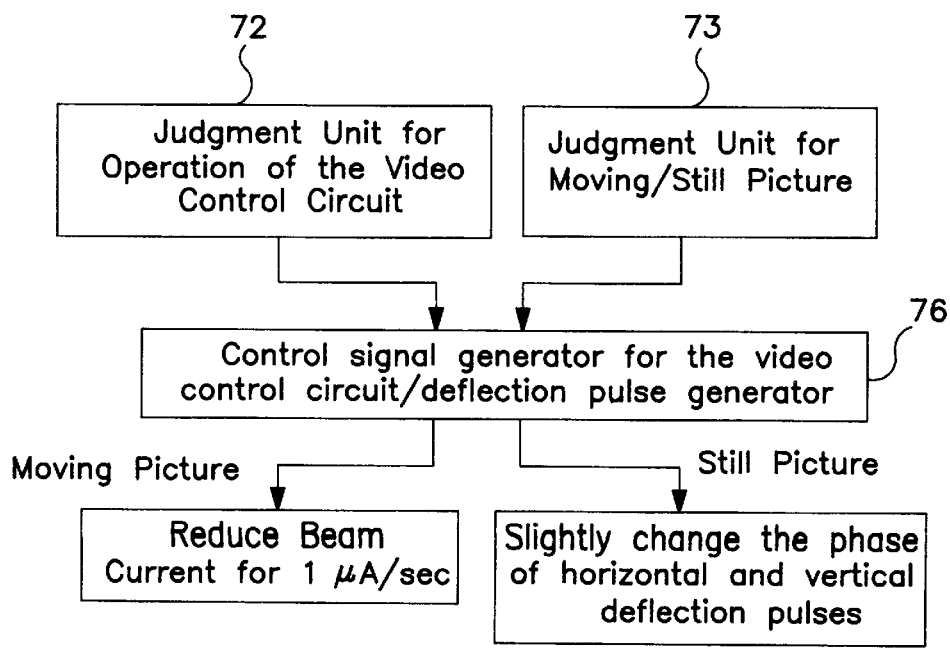
FIG. 13 is a flow chart illustrating an example of how a signal processor controls a video control circuit in a thirteenth exemplary embodiment of the present invention.

FIG. 13 is a flow chart illustrating an example of how the signal processor, employed in a protective circuit for the CRT and lens as described in the first to sixth exemplary embodiments, controls the video control circuit.

In FIG. 13, a judgment unit 72 for operation of the video control circuit is part of the implementing processing operation of the signal processor described in the seventh to ninth exemplary embodiments, and decides whether to reduce the video contrast.

A judgment unit for moving/still picture 73 determines whether a video image is a still or moving picture based on the detected value from each beam current detection circuit described in the second to fourth exemplary embodiments.

The video control circuit and a deflection pulse generator 76 reduces the beam current by 1 $\mu$A per second when the judgment unit 72 for operation of the video control circuit and the judgment unit for moving/still picture 73 detects a moving picture. Otherwise, the phase of the horizontal and vertical deflection pulses is changed slightly.

It will be apparent that the protective circuit for the CRT and lens of the present invention improves reliability and reduces cost when designed as a Large Scale Integrated Circuit (LSI). In the present invention, the signal processor can be easily feasible by the use of a microprocessor, but it is not essential. Comparators and the like can be configured with hardware, but can also be made feasible in software. The exemplary embodiments have referred to a picture-in-picture screen. However, it should be noted that the present invention is applicable to a multi-picture screen without being limited to two pictures. It will be appreciated that modifications may be made in the present invention. The preferred embodiments described herein are therefore illustrative and not restrictive, the scope of the invention being indicated by the appended claims, and all modifications which come within the true spirit of the claims are intended to be embraced therein.

What is claimed is:

1. A protective circuit for use with a CRT and a video signal comprising:

detection means for detecting a beam current in the CRT;

measuring means for measuring a variable duration of said detected beam current; and means for controlling a video contrast of an image corresponding to the video signal based on said detected beam current and said duration of said detected beam current.

2. A protective circuit for use with a CRT and a video signal comprising:

a beam current detection circuit, for detecting the beam current of the CRT;

a selecting circuit for selecting a detected value from said beam current detection circuit;

a signal processor which measures a duration of said detected beam current when said detected beam current exceeds a specified value, and outputs a control signal when said duration exceeds a specified time; and a video control circuit for controlling the contrast of an image corresponding to the video signal based on said control signal from said signal processor.

3. A protective circuit for use with a CRT and a video signal comprising:

a beam current detection circuit, for detecting the beam current of the CRT;

a signal processor, for receiving the detected beam current from said beam current detection circuit, and outputting a control signal based on said detected beam current and a respective variable duration of said detected beam current; and a video control circuit for controlling a contrast of an image corresponding to the video signal in accordance with said control signal from said signal processor.

4. A protective circuit as defined in claim 3, wherein the contrast is controlled by the beam current detection circuit by detecting the beam current of the CRT projecting a blue color.

5. A protective circuit for use with a video signal and a CRT projecting multiple pictures on a screen thereof, comprising:

a beam current detection circuit, for detecting a respective beam current of each of the multiple pictures;

a signal processor for transmitting multiple picture information to said beam current detection circuit, for receiving the detected beam current from said beam current detection circuit, and for generating a control signal based on said detected beam current of each of the multiple pictures and a respective variable duration of said detected beam current; and a video control circuit for controlling a contrast of an image corresponding to the video signal in accordance with the control signal from said signal processor.

6. A protective circuit as defined in claim 5, wherein the contrast is controlled by the beam current detection circuit by detecting the beam current of the CRT projecting a blue color in the multiple pictures.

7. A protective circuit as defined in claim 5 further comprising:

a video control circuit for controlling the contrast of the image corresponding to the video signal in accordance with the control signal from the signal processor;

a first amplifier for controlling a degree of amplification of the video signal of a main screen in accordance with the control signal from the signal processor;

a second amplifier for controlling a degree of amplification of the video signal of a sub-screen in accordance with the control signal from said signal processor; and a mix circuit for mixing an output of the first amplifier and the second amplifier.

8. A protective circuit as defined in claim 2, wherein the signal processor comprises:

comparison means for comparing the detected beam current from the beam current detection circuit and a specified standard beam current;

counting means for counting a duration of the detected beam current when said detected beam current exceeds the standard value;

comparison means for comparing the duration counted by the counting means and a specified standard duration value;

counter resetting means for resetting the counting means to zero when said duration is smaller than the standard duration value; and a control signal generator for generating a control signal for initializing the video control circuit when said duration is larger than the standard duration value.

9. A protective circuit as defined in claim 2, wherein the signal processor comprises:

first comparison means for comparing the detected beam current from the beam current detection circuit and a first specified standard value;

second comparison means for comparing the detected beam current with a second specified standard value when said detected beam current is smaller than said first standard value; and control signal generator which controls the video control circuit to one of:

a) maintain a present contrast when said detected beam current is larger than said second standard value, and b) release control of the contrast when said detected beam current is smaller than said second standard value.

10. A protective circuit as defined in claim 2, for maintaining the present state of the contrast, wherein the signal processor comprises:

comparison means for comparing a detected beam current from the beam current detection circuit and a third specified standard value; and a control signal generator for controlling the video control circuit to one of:

a) maintain a present state when said detected beam current is larger than the third standard value and continue to detect the beam current, and b) release control of the contrast when said detected beam current is smaller than the third standard value.

11. A protective circuit as defined in claim 2, wherein the signal processor at least one of:,:

a) reduces a speed at which beam current reduction occurs when the detected beam current changes more than once during a specified time, and b) increases the speed at which the beam current reduction takes place, when the detected beam current remains unchanged for the specified time.

12. A protective circuit as defined in claim 2, wherein the signal processor comprises:
   means for outputting a further control signal to reduce the contrast when the signal processor evaluates to output the control voltage for reducing the contrast; and
   means for indicating an on-screen indication for displaying a message on a screen of the CRT.

13. A protective circuit as defined in claim 2, wherein the signal processor comprises:
   means for outputting a further control signal to reduce the contrast when the signal processor evaluates to output the control voltage for reducing the contrast; and
   means for moving a display area on the CRT screen by changing phases of at least one of a horizontal deflection pulse and a vertical deflection pulse.

14. A protective circuit as defined in claim 1, wherein the CRT is a three gun CRT and said detection means detects a beam current in each CRT.

15. A protective circuit as defined in claim 14, wherein said detection means detects a beam current in each CRT of said three gun CRT.

16. A protective circuit as defined in claim 1, further comprising:
   comparison means for comparing said duration of said detected beam value and a specified time value,
   wherein said controlling means controls the beam contrast based on detected beam current value form said measuring means an output from said comparison means.

17. A protective circuit as defined in claim 2, wherein the CRT is a three gun CRT.

18. A protective circuit as defined in claim 3, wherein the CRT is a three gun CRT.

19. A protective circuit as defined in claim 18, wherein said detection means detects a beam current in each CRT of said three gun CRT.

20. A protective circuit as defined in claim 5, wherein the CRT is a three gun CRT.

21. A protective circuit as defined in claim 20, wherein said detection means detects a beam current in each CRT of said three gun CRT.

* * * * *